United States Patent [19]

Schulman

[11] 4,210,491
[45] Jul. 1, 1980

[54] METHOD AND APPARATUS FOR RETORTING A SUBSTANCE CONTAINING ORGANIC MATTER

[75] Inventor: Bernard L. Schulman, Golden, Colo.

[73] Assignee: Tosco Corporation, Los Angeles, Calif.

[21] Appl. No.: 951,723

[22] Filed: Oct. 16, 1978

Related U.S. Application Data

[63] Continuation of Ser. No. 737,466, Nov. 1, 1976, abandoned.

[51] Int. Cl.² .................. C10B 1/10; C10B 23/00; C10B 47/20; C10B 49/18
[52] U.S. Cl. .................................. 201/2.5; 110/230; 165/104 F; 201/12; 201/14; 201/16; 201/20; 201/25; 201/32; 201/44; 202/118; 202/135; 202/136
[58] Field of Search .................. 201/2.5, 10, 12, 14, 201/16, 20, 32, 44, 25; 202/118, 135, 137; 165/104 F; 122/4 D; 110/230

[56] References Cited

U.S. PATENT DOCUMENTS

| | | | |
|---|---|---|---|
| 1,810,828 | 6/1931 | Hayes | 202/118 |
| 1,908,256 | 5/1933 | Kazmann | 202/118 |
| 2,463,693 | 3/1949 | Huff | 202/118 |
| 3,110,652 | 11/1963 | Thomsen | 202/118 |
| 3,140,240 | 7/1964 | Fowler et al. | 202/118 |
| 3,616,266 | 10/1971 | Hall et al. | 202/118 |
| 3,655,518 | 4/1972 | Schmalfeld et al. | 202/118 |
| 3,893,426 | 7/1975 | Bryers | 122/4 D |
| 3,983,931 | 10/1976 | Whitehead et al. | 165/104 F |
| 3,984,288 | 10/1976 | Yoshida et al. | 201/2.5 |
| 3,997,407 | 12/1976 | Fuji et al. | 201/2.5 |

Primary Examiner—Bradley R. Garris
Attorney, Agent, or Firm—Poms, Smith, Lande & Rose

[57] ABSTRACT

An improved method and apparatus for converting a substance containing organic matter into hydrocarbon vapors and solids residue by feeding the substance into the upstream portion of a substantially cylindrical retort having a substantially horizontal longitudinal axis, substantially conveying the substance through the retort toward the downstream portion thereof, heating the retort by means of a fluidized bed of heated particles to a sufficient temperature to convert the substance into hydrocarbon vapors and solids residue and removing the hydrocarbon vapors and solids residue from the retort.

21 Claims, 5 Drawing Figures

METHOD AND APPARATUS FOR RETORTING A SUBSTANCE CONTAINING ORGANIC MATTER

This is a continuation of application Ser. No. 737,466, filed Nov. 1, 1976 parent application now abandoned.

BACKGROUND OF THE INVENTION

The present invention relates to a method and apparatus for converting a substance containing organic matter into hydrocarbon vapors and solids residue. (As used herein, "hydrocarbon vapors" means vapors including compounds comprised of hydrogen and carbon as well as compounds comprised of hydrogen, carbon and at least one other element.) More particularly, it relates to an improved method and apparatus for retorting substances such as oil shale, coal, tar sand, rubber, plastic wastes, wood wastes, etc. to recover hydrocarbon vapors and solids residue therefrom.

It has been known for many years that valuable hydrocarbon vapors and solids residue can be recovered from certain substances containing organic matter by heating the substances in a retort. A great variety of methods and apparatuses have been proposed and utilized to effectuate such type recovery, e.g., see U.S. Pat. No. 2,701,787, entitled "DISTILLATION OF OIL-BEARING MINERALS", and U.S. Pat. No. 3,658,654, entitled "SCREW-CONVEYING RETORTING APPARATUS WITH HYDROGENATION MEANS". To date developments in the technolgy of retorting substances containing organic matter have established such process as a viable means of producing organic products, as well as a means with excellent potential for recycling tire carcasses.

However, improvements are needed in current retorting technology to optimize product recoveries and enhance economic yields. Problem areas where the need for improvement is particularly acute involve (1) manipulating the substance containing organic matter during the retorting process, (2) heating the retort to bring about the desired conversion, (3) separating the conversion products, i.e., the hydrocarbon vapors and the solids residue, from each other, and (4) maximizing the utilization of heat generated to retort the substance containing organic matter.

SUMMARY OF THE INVENTION

The present invention affords improvements over currently known systems in the aforementioned problem areas such that the retorting operation may be more effectively and efficiently conducted.

It is an object of this invention to provide a method and apparatus which allow for the unimpeded manipulation of a wide range of substances containing organic matter during the retorting process.

Another object of the present invention is to provide a method and apparatus which afford a relatively safe, highly efficient means of retort heating that is particularly well-suited to the total retorting system.

Yet another object of this invention is to provide a method and apparatus which make possible the substantially complete separation of the hydrocarbon vapors and solids residue converted from the substance containing organic matter.

A further object of the current invention is to provide a method and apparatus which tend to maximize utilization of the heat generated to retort the substance containing organic matter.

Many other features, advantages and additional objects of the present invention will become manifest to those versed in the art upon making reference to the detailed description which follows and the accompanying sheets of drawings in which preferred embodiments incorporating the principles of this invention are disclosed as illustrative examples only.

DESCRIPTION OF THE PREFERRED EMBODIMENTS

Figure 1:
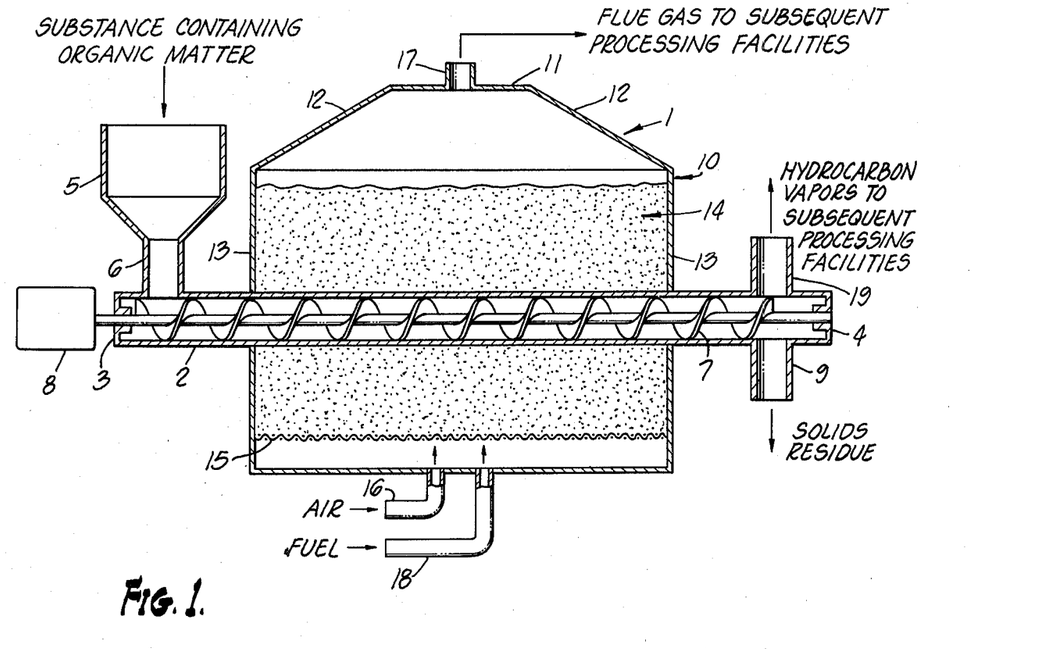
FIG. 1 is a diagrammatic, elevational view, in partial cross-section, of the basic preferred embodiment of the present invention.

The basic preferred embodiment of the present invention is depicted in FIG. 1. The numeral 1 generally designates a novel, highly efficient apparatus, preferably of steel construction for converting a substance containing organic matter into hydrocarbon vapors and solids residue. The apparatus 1 includes a substantially cylindrical retort 2, having an upstream end 3 and a downstream end 4, the longitudinal axis of the retort being substantially parallel to a horizontal plane.

Communicating with the upstream portion of the retort 2 are feeding means for feeding the substance containing organic matter into the retort 2. In this embodiment of the present invention, the feeding means include a feed bin 5 and feeding conduit 6, one end of the feeding conduit 6 communicating with the bottom of the feed bin 5, while the other end thereof communicates with the top of the upstream portion of the retort 2.

Located within the retort 2 is a spiral conveyor 7 for moving material from the upstream portion of the retort 2 to the downstream portion thereof. Attached to the end of the spiral conveyor 7 corresponding to the upstream end of the retort 2 are driving means 8 for driving the spiral conveyor 7. The spiral conveyor 7 is shown in FIG. 1 as a screw conveyor, but, of course, it could be any other type thereof.

Communicating with the downstream portion of the retort 2 are solids residue removing means for removing solids residue from the retort 2. As a part of this embodiment of the present invention, the solids residue removing means comprise a solids residue removal conduit 9 communicating with the lower portion of the retort 2 proximate the downstream end 4 thereof. It is noted that some plastic wastes do not produce any solids residue when retorted. Consequently, the solids residue removing means may be eliminated from embodiments of the present invention when they are used to retort such plastic wastes.

Encasing a portion of the retort 2 between the feeding means and the solids residue removing means is a fluidized bed housing, generally designated 10, the walls of which are preferably heat insulated. The body of the fluidized bed housing 10, i.e., the housing excluding the top thereof, is preferably rectangularly shaped and positioned such that its longitudinal axis substantially coincides with the longitudinal axis of the retort 2. The top of the fluidized bed housing 10 has a flat portion 11 centrally located above the body of the fluidized bed housing 10 with four downwardly inclining segments 12 joining the flat portion 11 of the top of the fluidized bed housing 10 with the side walls 13 of the body of the fluidized bed housing 10.

Associated with the fluidized bed housing 10 are fluidizing means for maintaining within the fluidized bed housing 10 a fluidized bed, generally designated 14, of heated particles with which to heat the retort 2. As illustrated in FIG. 1, the fluidizing means include a fluidizing grid 15, an air inlet pipe 16 and a flue gas outlet pipe 17. The fluidizing grid 15 attaches to the side walls of the fluidized bed housing 10 between the bottom wall of the fluidized bed housing 10 and the bottom of the retort 2, being positioned substantially within a horizontal plane. The air inlet pipe 16 communicates with the interior of the fluidized bed housing 10 at a point near the center of the bottom wall of the fluidized bed housing 10. The air inlet pipe 16 provides a passageway for air to enter the fluidized bed housing 10 and be forced upwardly through the fluidizing grid 15 to fluidize the bed of particles situated thereabove. The flue gas outlet pipe 17 affords a means of escape for the fluidizing air.

As understood by those versed in the art, the fluidizing means may, however, include a variety of elements other than those disclosed which will cooperate to maintain a bed of particles in a state of fluidization.

The apparatus 1 for converting a substance containing organic matter into hydrocarbon vapors and solids residue also includes heating means for heating the particles constituting the fluidized bed 14. In this embodiment, the heating means comprise a fuel inlet pipe 18 which communicates with the interior of the fluidized bed housing 10 at a point near the center of the bottom wall of the fluidized bed housing 10. The fuel inlet pipe 18 affords a passageway for fuel to be injected into the interior of the fluidized bed housing 10, there to be ignited to heat the particles composing the fluidized bed 14. Gaseous products produced by the combustion of the fuel escape the fluidized bed housing 10, along with the fluidizing air, through the flue gas outlet 17.

Finally, communicating with the retort 2 at a point located downstream from the feeding means are hydrocarbon vapors removing means for removing hydrocarbon vapors from the retort 2. As incorporated into the basic preferred embodiment of the instant invention, the hydrocarbon vapors removing means comprise a hydrocarbon vapors removal conduit 19 communicating with the upper portion of the retort 2 proximate the downstream end 4 thereof.

It is noted that the structure immediately heretofore described affords a great many advantages in the retorting of substances containing organic matter. The provision of a substantially cylindrical, substantially horizontal retort 2 with a spiral conveyor 7 mounted therewithin makes it possible to efficiently retort a side range of substances containing organic matter. That is, within broad limits, the physical characteristics of the substances do not prohibit their unimpeded manipulation during the retorting process. The substance fed into the retort 2 may be liquid or solid. The particle size of solid substances may vary from very fine to very coarse. Even large chunks of a substance containing organic matter may be fed into the retort 2. Substances which are, or become during retorting, very cohesive still make suitable feed materials, since they are easily moved by the spiral conveyor 7 and, thus, will not plug the retort 2.

With other type retorts, especially those which require the fluidization of the substance being retorted, the physical properties of the feed materials are determinative of whether or not such feed material can be successfully retorted therein. Unless the feed material is fine enough to be fluidized and unless it is such that it will not plug the retort, retorts requiring fluidization of the substance being retorted are inoperative.

The provision of a substantially cylindrical, substantially horizontal retort 2 with a spiral conveyor 7 therewithin makes it possible to move the substance containing organic matter through the retort 2 as it is being converted to hydrocarbon vapors and solids residue, while agitating the substance and allowing contact to be maintained between the substance and the interior surface of the retort 2, which promote especially effective retorting.

Furthermore, provision of such a retort 2 and spiral conveyor 7 allows for the rapid disengagement of the hydrocarbon vapors from the solids residue as conversion takes place within the retort 2.

Figure 5:
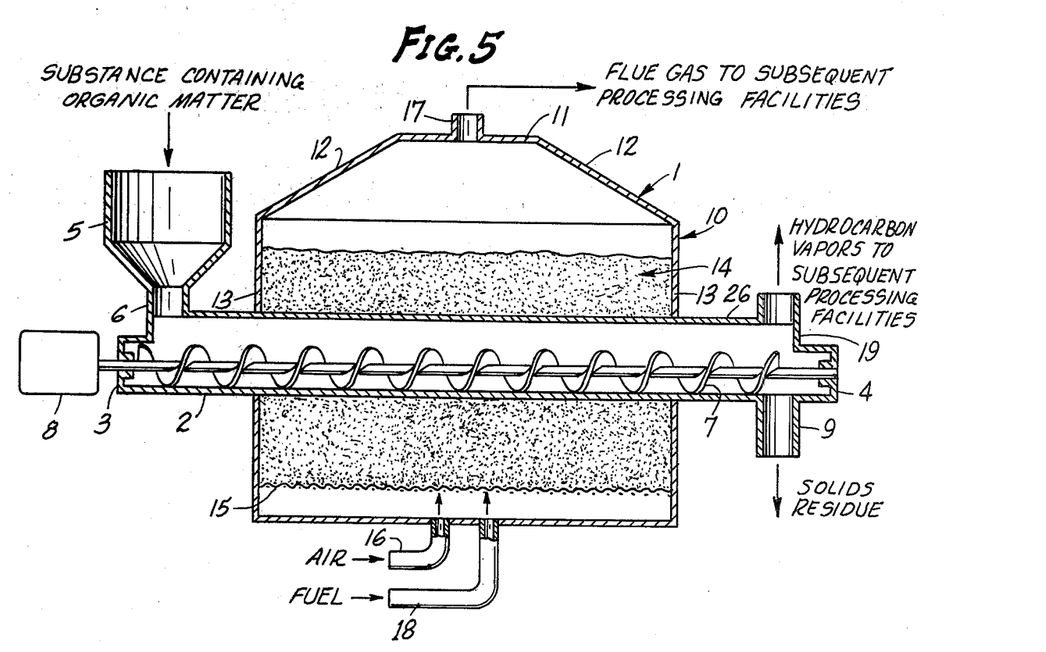
FIG. 5 is a diagrammatic, elevational view, in partial cross-section, of a modified preferred embodiment of the present invention which increases the maximum feed rate of the substance containing the organic matter.

It is noted that an increase in the maximum feed rate to the retort 2 can be realized by replacing the approximate top half of the retort 2 with a covering 26 (as shown in FIG. 5) which accommodates the spiral conveyor 7 and which has a greater cross-sectional area than such approximate top half of the retort 2 at each point along the length of the retort 2 from where the feeding means communicates with the retort 2 to where the solids residue removing means communicate with the retort 2. This modification also allows for even better disengagement of the hydrocarbon vapors from the solids residue than with a substantially cylindrical retort due to the increased volume of the approximate top half of the retort.

In practice, a substance containing organic matter is fed via the feed bin 5 and the feeding conduit 6 into the upstream portion of the retort 2. It is then conveyed by means of the spiral conveyor 7 toward the downstream portion of the retort 2.

The retort 2 is heated to a sufficient temperature to convert the substance containing organic matter into hydrocarbon vapors and solids residue. Normally, the temperature to which the substance within the retort 2 is heated is greater than approximately 700° F. and preferably approximately 850° F. to approximately 1000° F.

This heating is performed by maintaining within the fluidized bed housing 10, proximate the retort 2, the fluidized bed 14 of heated particles. To heat the substance to the temperatures mentioned above, the temperature of the fluidized bed 14 is normally maintained at approximately 1000° F. to approximately 1600° F. It is noted that when the fluidized bed 14 is comprised of particles having a relatively high nitrogen content, the formation of $NO_x$ compounds is relatively low in this temperature range.

For the most effective heating, the level of the fluidized bed 14 is maintained above the top of the retort 2. The bed of particles is fluidized by injecting a stream of air through the air inlet pipe 16 into the fluidized bed housing 10 and upwardly through the fluidizing grid 15. The particles are heated by igniting a stream of fuel which is injected into the fluidized bed housing 10 through the fuel inlet pipe 18.

Flue gas, which is composed of the fluidizing air having passed through the fluidized bed 14 and the gaseous products from the combustion of the fuel, is allowed to escape from the fluidized bed housing 10 through flue gas outlet pipe 17.

It is noted that utilization of a fluidized bed 14 of heated particles to heat the retort 2 is preferable for several reasons. Fluidized-bed heating is relatively safe and highly efficient. It is substantially non-corrosive, simple from a design standpoint, can produce and withstand relatively high temperatures (i.e., in excess of 1600° F.) and is relatively inexpensive. The temperature of a fluidized bed can be easily controlled and generally is uniform throughout the bed.

Fluidized-bed heating is particularly well-suited to the total retorting system of the instant invention because carbonaceous gases, liquids or solids, all of which are by-products of the systems, can be burned to heat the particles of the fluidized bed 14.

Another advantage of fluidized-bed heating is that particles of substances such as limestone may be dispersed throughout the fluidized bed 14 to control pollutants such as sulfur dioxide when sulfur-containing fuels are burned to heat the particles of the fluidized bed 14. In fact, when solids residue from oil shale is used as the particles of the fluidized bed 14, the presence of carbonates in the solids residue provides for the retention of sulfur and limits its emission to the atmosphere.

Additionally, since the particles of the fluidized bed 14 do not directly contact the substance being retorted, there is no danger of such particles absorbing compounds produced during the retorting, which can be a problem with systems employing direct-contact heating.

The hydrocarbon vapors converted from the substance containing organic matter are removed from the retort 2 through hydrocarbon vapors removal conduit 19 and transferred to subsequent processing facilities where hydrocarbon-containing gases and liquids are normally produced.

The solids residue converted from the substance containing organic matter is removed from the retort 2 through the solids residue removal conduit 9. Normally, the length of time between when the substance containing organic matter is fed into the retort 2 and when corresponding solids residue is removed from the retort 2 is approximately 1 to approximately 5 minutes.

Depending upon the substance fed into the retort 2, the solids residue resulting therefrom may have a variety of uses. In certain instances, the solids residue removed from the retort 2 may be employed as particles of the fluidized bed 14.

Figure 2:
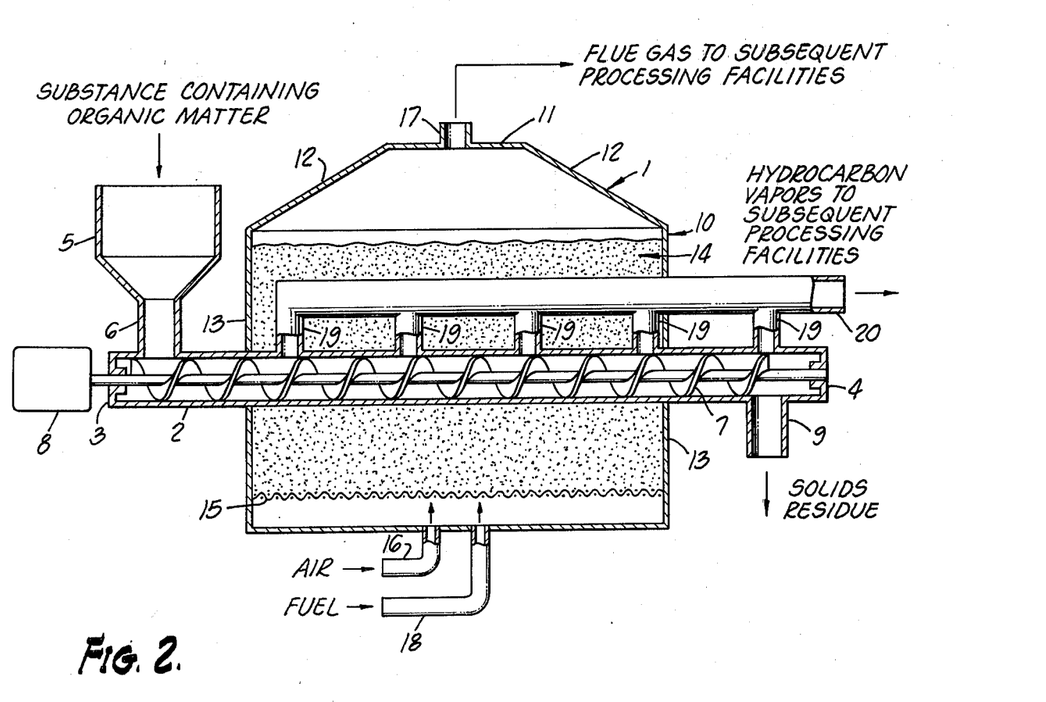
FIG. 2 is a diagrammatic, elevational view, in partial cross-section, of a modified preferred embodiment of the present invention which affords enhanced separation of the conversion products.

A modified preferred embodiment of the present invention is illustrated in FIG. 2. As is readily seen, the modified preferred embodiment of FIG. 2 is identical to the basic preferred embodiment of FIG. 1, except for a change in the hydrocarbon vapors removing means for removing hydrocarbon vapors from the retort 2. In this modified embodiment, the hydrocarbon vapors removing means communicate with the retort 2 at a plurality of points located substantially along the top of the retort 2 and downstream from the feeding means.

As depicted in FIG. 2, the hydrocarbon vapors removing means comprise a plurality of substantially cylindrical hydrocarbon vapors removal conduits 19 and a substantially cylindrical hydrocarbon vapors removal header 20. The hydrocarbon vapors removal header 20 is preferably located directly above the retort 2, having a longitudinal axis substantially parallel to the longitudinal axis of the retort 2. The hydrocarbon vapors removal conduits 19 are aligned substantially along the top of the retort and downstream from the feeding means with the longitudinal axes thereof being substantially perpendicular to the longitudinal axis of the retort 2. One end of each of the hydrocarbon vapors removal conduits 19 communicates with the upper portion of the retort 2 and the other end of each of the hydrocarbon vapors removal conduits 19 communicates with the hydrocarbon vapors removal header 20.

Utilization of the type arrangement just described allows for the hydrocarbon vapors to be removed at a plurality of points located substantially along the top of the retort 2. In this manner, the hydrocarbon vapors may be removed from the retort 2 substantially as they are formed, thereby minimizing the entrainment of fine solid particles, of which solids residue is generally predominantly comprised, with the vapors as they exit the retort 2. This makes possible the substantially complete separation of the hydrocarbon vapors and the solids residue converted from the substance containing organic matter.

Figure 3:
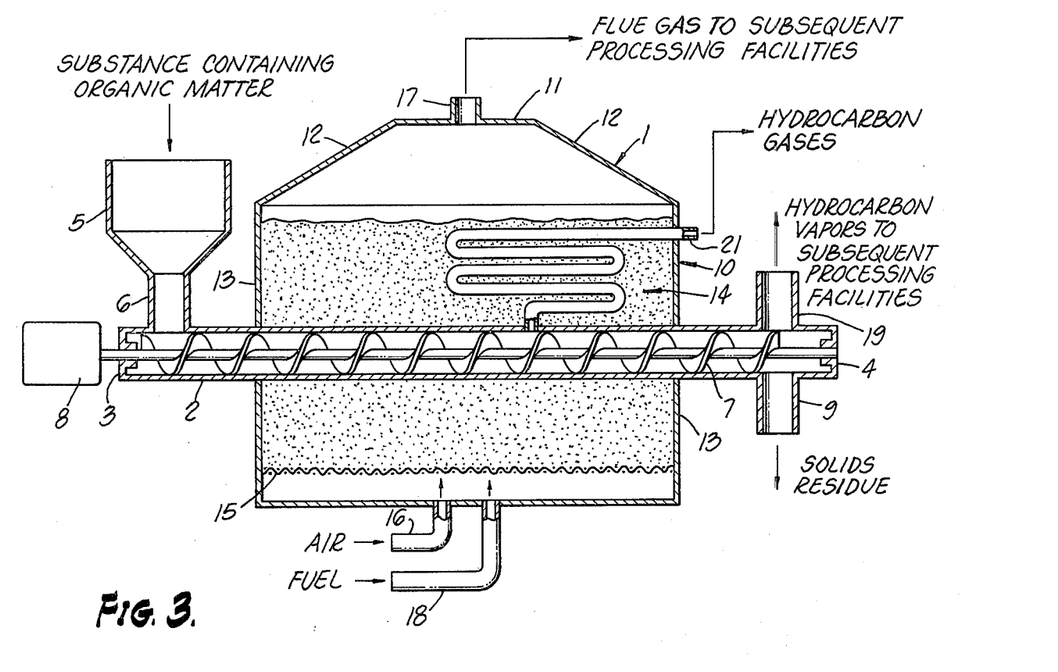
FIG. 3 is a diagrammatic, elevational view, in partial cross-section, of a modified preferred embodiment of the present invention which tends to maximize utilization of the heat generated to retort the substance containing organic matter by channeling hydrocarbon vapors through a fluidized bed of heated particles to crack the hydrocarbon vapors to hydrocarbon gases.

Another modified preferred embodiment of the present invention is shown in FIG. 3. This modified embodiment is identical to the basic preferred embodiment illustrated in FIG. 1, except that this modified embodiment includes hydrocarbon vapors channeling means for channeling at least a portion of the hydrocarbon vapors converted from the substance containing organic matter through the fluidized bed 14 of heated particles maintained within the fluidized bed housing 10.

The hydrocarbon vapors channeling means preferably communicate with the retort 2 at a point located upstream from the hydrocarbon vapors removing means and within the fluidized bed housing 10. It is noted that the hydrocarbon vapors channeling means may instead communicate with the hydrocarbon vapors removing means, although the hydrocarbon vapors removing means may be located outside the fluidized bed housing 10 and, thus, require the hydrocarbon vapors channeling means to be routed into the fluidized bed housing 10, rather than initiating there.

In this embodiment of the present invention, the hydrocarbon vapors channeling means comprise a hydrocarbon vapors channeling conduit 21 which communicates with the upper portion of the retort 2 at a point upstream from the hydrocarbon vapors removing means and within the fluidized bed housing 10. This hydrocarbon vapors channeling conduit 21 follows a serpentine path through the fluidized bed 14 of heated particles maintained within the fluidized bed housing 10.

The hydrocarbon vapors removed from the retort 2 are channeled through the fluidized bed 14 of heated particles to crack the hydrocarbon vapors to hydrocarbon gases, thereby tending to maximize utilization of the heat generated to retort the substance containing organic matter. Normally, a separate unit with an extraneous heat source is utilized to crack hydrocarbon vapors from a retorting process to hydrocarbon gases. With such an arrangement, not only is heat generally lost in transferring the hydrocarbon vapors to the separate unit, but a considerable amount of additional equipment is required as well.

Figure 4:
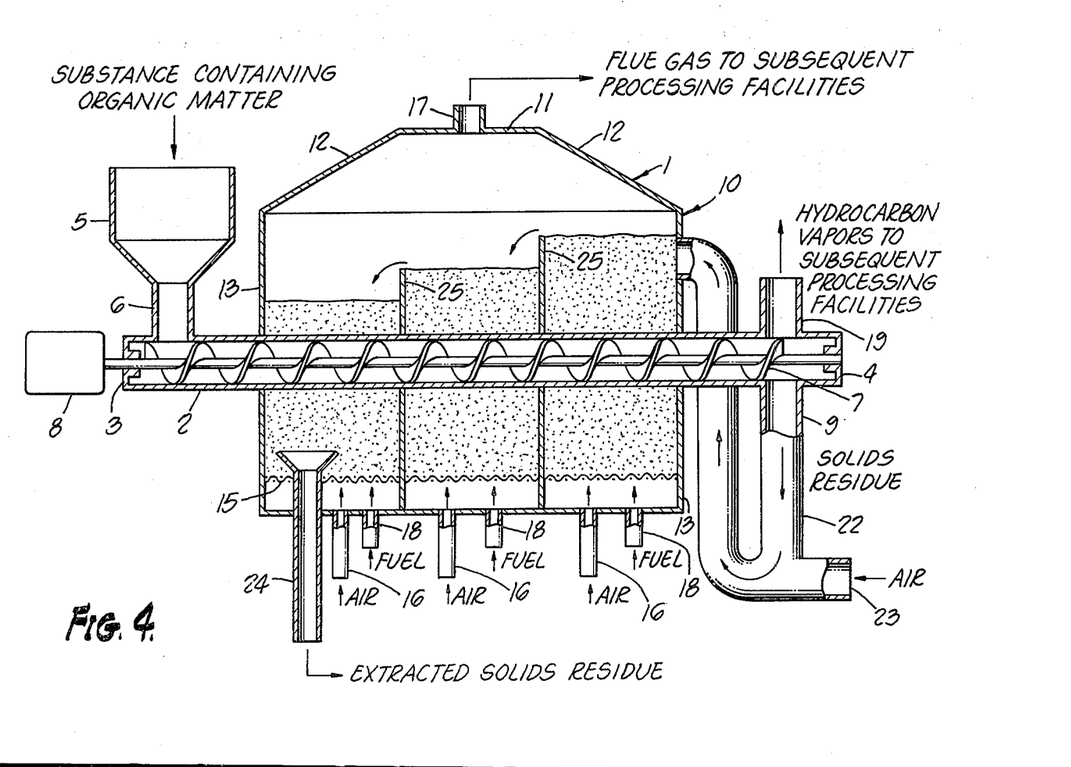
FIG. 4 is a diagrammatic, elevational view, in partial cross-section, of a modified preferred embodiment of the present invention which tends to maximize utilization of the heat generated to retort the substance containing organic matter by employing the solids residue as particles of the fluidized bed and controlling the flow of the solids residue while it is being so employed such that it flows in a direction substantially countercurrent to the flow within a retort of the substance containing organic matter.

Another modified preferred embodiment of the present invention is depicted in FIG. 4. As with the modified preferred embodiments of FIGS. 2 and 3, this modified preferred embodiment is identical to the basic preferred embodiment of FIG. 1, except for certain changes and additions.

Solids residue introducing means for introducing solids residue removed from the retort 2 into the fluidized bed housing 10 are added in order to employ the solids residue as particles of the fluidized bed 14. One end of the introducing means communicates with the solids residue removing means and the other end thereof communicates with the fluidized bed housing 10.

In this modified embodiment, the solids residue introducing means comprise a solids residue introducing conduit 22. One end of the solids residue introducing conduit 22 communicates with the solids residue removal conduit 9 and the other end of the solids residue introducing conduit 22 communicates with the interior of the fluidized bed housing 10 at a point near the top of the upstream end of the fluidized bed housing 10. Furthermore, the solids residue introducing conduit 22 has an air injection port 23 through which air is injected into the solids residue introducing conduit 22 to move solids residue therethrough and into the fluidized bed housing 10.

Also added as a part of this modified preferred embodiment are solids residue extracting means for extracting solids residue from the fluidized bed housing 10. In FIG. 4, the solids residue extracting means are illustrated as a solids residue extracting funnel 24, the top of which is located in the lower downstream portion of the fluidized bed housing 10 above the fluidizing grid 15, with the stem thereof passing downwardly through the fluidizing grid 15 and the bottom wall of the fluidized bed housing 10.

Another addition of this modified embodiment of the present invention is that of solids residue flow controlling means for controlling the flow of the solids residue while the solids residue is being employed as particles of the fluidized bed 14 such that the solids residue flows in a direction substantially countercurrent to the flow within the retort 2 of the substance containing organic matter.

In the present modified embodiment, the solids residue flow controlling means comprise at least one partition 25 (the apparatus of FIG. 4 having two such partitions 25) separating the fluidized bed housing 10 into a plurality of successively adjacent sections aligned such that the first thereof is nearest the upstream end of the fluidized bed housing 10 and the last thereof is nearest the downstream end of the fluidized bed housing 10. Each partition 25 has a height greater than the height of the top of the retort 2 and less than the height of the inside of the fluidized bed housing top immediately thereabove. Furthermore, each partition 25 which is downstream from another partition 25 has a height which is less than the height of the partition 25 immediately upstream therefrom.

It is noted that FIG. 4 is shown with two partitions 25 for illustration only and that the number actually used will normally depend upon the economics of a given application.

Also, as part of this modified embodiment, the solids residue flow controlling means include regulating means for regulating the levels of the fluidized bed sections maintained within the fluidized bed housing sections, whereby solids residue which is in a section of the fluidized bed housing 10 upstream from another section thereof may be caused to overflow into the section of the fluidized bed housing 10 which is immediately downstream therefrom. As shown in FIG. 4, the regulating means comprise an air inlet pipe 16 located beneath each fluidized bed housing section. These air inlet pipes 16 provide passageways for fluidizing air to enter each of the fluidized bed housing sections separately. Valves (not shown) on the air inlet pipes 16 may be adjusted to allow the appropriate flow of air into the fluidized bed housing sections to maintain the level of the fluidized bed section therein at the desired level.

It is noted that with an arrangement of fluidized bed housing sections such as that just discussed, it is preferred to have a fuel inlet pipe 18 communicate with each fluidized bed housing section so that the temperature of the various fluidized bed housing sections may be controlled by regulating the flow of fuel thereto. As shown in FIG. 4, the fuel inlet pipes 18 are located beneath each fluidized bed housing section.

In utilizing this modified preferred embodiment, solids residue removed from the retort 2 is introduced into the top downstream portion of the fluidized bed 14 to employ the solids residue as particles of the fluidized bed 14. The flow of the solids residue is controlled while the solids residue is being employed as particles of the fluidized bed 14 such that the solids residue flows in a direction substantially countercurrent to the flow within the retort 2 of the substance containing organic matter. Finally, solids residue is extracted from the lower downstream portion of the fluidized bed 14.

With this embodiment, the flow of the solids residue is controlled in the aforementioned manner by separating the fluidized bed into a plurality of successively adjacent sections aligned such that the first thereof is nearest the upstream end of the fluidized bed 14 and the last thereof is nearest the downstream end of the fluidized bed 14, and causing the solids residue which is in a section of the fluidized bed 14 upstream from another section thereof to overflow into the section of the fluidized bed 14 which is immediately downstream therefrom.

One reason for so introducing solids residue into the fluidized bed housing 10 is that in most cases, the solids residue removed from the retort 2 has an appreciable amount of carbon associated therewith. Solids residue from oil shale which yields approximately 30 to 40 gallons of oil per ton normally contains approximately four to five weight percent carbon. Carbon-containing solids residue is a supplemental fuel source and when it is introduced into the fluidized bed 14, less fuel needs to be injected into the fluidized bed housing 10 through the fuel inlet pipes 18. The result is substantial savings in fuel costs.

Such is the case even controlling the flow of the solids residue while the solids residue is being employed as particles of the fluidized bed 14 such that the solids residue flows in a direction substantially counter-current to the flow within the retort of the substance containing organic matter. However, by so controlling the solids residue, the heat contained by the solids can be utilized to help retort the substance containing organic matter, while simultaneously cooling the solids residue, cooling which normally must be done in any event before subsequent handling of the solids residue. This practice tends to maximize the utilization of the heat generated to retort the substance containing organic matter. Furthermore, it avoids the use of high temperature cooling equipment, such as rotary coolers, which would otherwise normally be used to cool the solids residue.

With a unit having three fluidized bed sections such as that illustrated in FIG. 4, the temperature of the section nearest the upstream end of the fluidized bed housing 10 is preferably maintained at approximately 1200° F. to approximately 1600° F. A temperature of this magnitude provides a suitable driving force for heating the substance within the hottest portion of the retort 2 to approximately 1200° F.

The temperature of the middle fluidized bed section is preferably maintained at approximately 600° F. to approximately 800° F. By so doing, an appropriate driving force is provided to heat the substance within the section of the retort 2 immersed by the middle fluidized bed section to approximately 600° F.

The temperature of the fluidized bed section nearest the downstream end of the fluidized bed housing 10 is preferably maintained at approximately 300° F. to approximately 400° F., whereby the substance is initially heated to approximately 300° F. Substantially cooled residue is extracted from this fluidized bed section via the solids residue extracting funnel 24 and may then be directed to some form of low temperature cooler, such as moisturizer, for final cooling before ultimate collection.

It is noted that in most cases, solids residue should be introduced into the fluidized bed housing 10 only if it is derived from a substance having a predominantly inorganic matrix, such as oil shale, tar sand or diatomite. The solids residue from such substances is able to withstand the level of temperature required for retorting these substances without decomposing.

In contrast, the solids residue from substances not having a predominantly inorganic matrix, such as rubber, is usually consumed to a great extent at retorting temperatures. Consequently, such solids residue will generally not function as well as the solids residue derived from substances having a predominantly inorganic matrix when employed as the particles of the fluidized bed 14.

However, when coal, which has a predominantly organic matrix, is the substance being retorted, a very beneficial by-product can be attained by introducing the solids residue into the fluidized bed housing 10. By so doing, the volatile matter of the solids residue can be substantially reduced to yield a material suitable for the manufacture of metallurgical coke or formcoke.

Also, when coal which tends to cake is retorted within the retort 2, the addition of a relatively small amount of solids residue may be made to the coal being fed to the retort 2 to prevent such caking. The solids residue effectively separates the particles of coal which have a tendency to cake.

In the case of the retortion of tar sand, a feeding problem may be incurred due to the sometimes tacky nature of the substance. This problem can usually be overcome by mixing hot solids residue, i.e., solids residue having a temperature greater than approximately 300° F., with the tar sand in the feed bin 5, thereby warming the tar sand which makes it easier to feed to the reactor. Obviously, a ready source of such solids residue is that exiting the fluidized bed housing 10 via the solids residue extracting funnel 24 or if hotter solids residue is desired, it can be routed to the feed bin 5 directly from the solids residue removal conduit 9.

Also, this mixing of the tar sand with hot solids residue facilitates the retorting of the tar sand by raising the temperature of the tar sand before introduction into the retort 2.

It is noted that this same procedure, i.e. mixing hot solids residue with a substance containing organic matter before introduction of both into the retort 2, may be practiced with substantially all substances containing organic matter to facilitate the retorting thereof.

Although minor alterations in my presently disclosed invention might be suggested by those versed in the art, it should be understood that I wish to emboy within the coverage of the patent warranted hereon all modifications which come within the full scope of my contribution to the art.

I claim:

1. An apparatus for converting a substance containing organic matter into hydrocarbon vapors and solids residue comprising:
    (a) a fluidized bed housing having an upstream end and a downstream end;
    (b) a substantially cylindrical retort, extending through and stationary relative to said fluidized bed housing and having an upstream end and a downstream end, each end being outside of said housing, the longitudinal axis of said retort being substantially parallel to a horizontal plane;
    (c) feeding means for feeding the substance containing organic matter into said retort, said feeding means communicating with the upstream portion of said retort;
    (d) means located within said retort for moving the substance containing organic matter from the upstream portion of said retort to the downstream portion thereof;
    (e) solids residue removing means for removing solids residue from said retort, said solids residue removing means communicating with the downstream portion of said retort;
    (f) solids residue introducing means for introducing said solids residue removed from said retort into said fluidized bed housing to employ said solids residue as particles of a fluidized bed, one end of said introducing means communicating with said solids residue removing means and the other end thereof communicating with the upper upstream portion of said fluidized bed housing;
    (g) solids residue extracting means for extracting solids residue from said fluidized bed housing and communicating with the lower downstream portion of said fluidized bed housing;

(h) fluidizing means for maintaining within said fluidized bed housing a fluidized bed of heated particles of solids residue with which to heat said retort;
(i) heating means for heating the particles;
(j) hydrocarbon vapors removing means for removing hydrocarbon vapors from said retort, said hydrocarbon vapors removing means communicating with said retort at at least one point located downstream, with respect to the flow of said substance containing organic matter in said retort, from said feeding means;
(k) solids residue flow controlling means for controlling the flow of the solids residue while the solids residue is being employed as particles of the fluidized bed such that the solids residue flow from the upstream portion to the downstream portion of said fluidized bed housing and in a direction substantially countercurrent to the flow within said retort of the substance containing organic matter, said solids residue flow controlling means including at least one partition separating said fluidized bed housing into a plurality of successively adjacent sections aligned such that the first thereof is nearest the upstream end of said fluidized bed housing and the last thereof is nearest the downstream end of said fluidized bed housing, each partition having a height greater than the height of the top of the retort and less than the height of the inside of the fluidized bed housing top immediately thereabove, each partition which is downstream, with respect to the flow of particles in said fluidized bed housing, from another partition having a height which is less than the height of the partition immediately upstream therefrom, with respect to the flow of particles in said fluidized bed housing; and
(l) regulating means for regulating the levels of the fluidized bed sections maintained within the fluidized bed housing whereby solids residue which is in a section of said fluidized bed housing upstream, with respect to the flow of particles in said fluidized bed housing, from another section thereof may be caused to overflow into the section of the fluidized bed housing which is immediately downstream therefrom with respect to the flow of particles in said fluidized bed housing.

2. The invention claimed in claim 1 wherein the approximate top half of said retort is replaced with a covering which accommodates said means located within said retort for moving the substance containing organic matter from the upstream portion of said retort to the downstream portion thereof and which has a greater cross-sectional area than such approximate top half of said retort at each point along the length of said retort from where said feeding means communicates with said retort to where said solids residue removing means communicates with said retort.

3. The invention claimed in claim 1 wherein the hydrocarbon vapors removing means communicate with said retort at a plurality of points located substantially along the top of said retort and downstream, with respect to the flow of said substance containing organic matter in said retort, from said feeding means.

4. The invention claimed in claim 1 further comprising hydrocarbon vapors channeling means for channeling hydrocarbon vapors through the fluidized bed of heated particles maintained within said fluidized bed housing to crack the hydrocarbon vapors to hydrocarbon gases, said hydrocarbon vapors channeling means communicating with said hydrocarbon vapors removing means.

5. The invention claimed in claim 1 further comprising hydrocarbon vapors channelling means for channelling at least a portion of the hydrocarbon vapors converted from the substance containing organic matter through the fluidized bed of heated particles maintained within said fluidized bed housing to crack the hydrocarbon vapors to hydrocarbon gases, said hydrocarbon vapors channelling means communicating with said retort at a point located upstream, with respect to the flow of said substance containing organic matter in said retort, from said hydrocarbon vapors removing means and within said fluidized bed housing.

6. The invention claimed in claim 1 wherein the heating means includes fuel inlet means for injecting a fuel gas into the fluidized bed housing for heating the particles of the fluidized bed.

7. A process for converting a substance containing organic matter into hydrocarbon vapors and solids residue comprising:
(a) fluidizing a bed of heated particles in a fluidized bed housing;
(b) feeding the substance containing organic matter into the upstream portion of a substantially cylindrical retort having a tubular body extending through and stationary relative to said fluidized bed housing, said cylindrical retort having an upstream end and a downstream end and a longitudinal axis which is substantially parallel to a horizontal plane;
(c) conveying the substance containing organic matter within the retort from the upstream portion to the downstream portion of the retort;
(d) heating the retort to a sufficient temperature to convert the substance containing organic matter into hydrocarbon vapor and particles of solids residue, removing said hydrocarbon vapors and said particles of solids residue from said retort, conveying said solids residue to said fluidized bed housing to heat said substance containing organic matter by maintaining proximate the retort said bed of heated particles;
(e) introducing said particles of solids residue removed from the retort into the top upstream portion of the fluidized bed;
(f) controlling the flow of said particles of solids residue in the fluidized bed such that said particles of solids residue flow from the upstream portion to the downstream portion of the fluidized bed and in a direction substantially countercurrent to the flow within the retort of the substance containing organic matter;
(g) extracting said particles of solids residue from the lower downstream portion of the fluidized bed;
(h) said controlling including separating the fluidized bed into a plurality of successively stepped adjacent sections aligned such that the first and highest thereof is nearest the upstream end of the fluidized bed and the last and lowest thereof is nearest the downstream end of the fluidized bed; and
(i) said controlling further including causing the solids residue which is in a section of the fluidized bed upstream, with respect to the flow of particles in said fluidized bed, from another section thereof to overflow into the section of the fluidized bed which is immediately downstream therefrom, with respect to the flow of particles in fluidized bed.

8. The invention claimed in claim 7 wherein the substance within the retort is heated to a temperature greater than approximately 700° F.

9. The invention claimed in claim 7 wherein the substance within the retort is heated to a temperature of approximately 850° F. to approximately 1000° F.

10. The invention claimed in claim 7 wherein the length of time between when the substance containing organic matter is fed into the retort and when corresponding solids residue is removed from the retort is approximately 1 to approximately 5 minutes.

11. The invention claimed in claim 7 wherein the removal of the hydrocarbon vapors is performed by removing the hydrocarbon vapors at a plurality of points located substantially along the top of the retort.

12. The invention claimed in claim 7 further comprising channeling hydrocarbon vapors removed from the retort through the fluidized bed of heated particles to crack the hydrocarbon vapors to hydrocarbon gases.

13. The invention claimed in claim 7 wherein the substance containing organic matter is rubber.

14. The invention claimed in claim 7 wherein the fluidized bed is separated into three successively adjacent sections with the temperature of the section nearest the upstream end of the fluidized bed maintained at approximately 1200° F. to approximately 1600° F., the temperature of the middle section maintained at approximately 600° F. to approximately 800° F., and the temperature of the section nearest the downstream end of the fluidized bed maintained at approximately 300° F. to approximately 400° F.

15. The invention claimed in claim 9 wherein the substance containing organic matter has a predominantly inorganic matrix.

16. The invention claimed in claim 9 wherein the substance containing organic matter is oil shale.

17. The invention claimed in claim 7 wherein the fluidized bed particles are heated by contacting said particles with a fuel gas and igniting said fuel gas.

18. The invention claimed in claim 9 wherein the substance containing organic matter is coal.

19. The invention claimed in claim 18 wherein solids residue is added to the coal before both are fed into the retort.

20. The invention claimed in claim 9 wherein solids residue having a temperature greater than approximately 300° F. is mixed with the substance containing organic matter before introduction of both into the retort.

21. The invention claimed in claim 20 wherein the substance containing organic matter is tar sand.

* * * * *